United States Patent
Choi et al.

(10) Patent No.: US 8,094,616 B2
(45) Date of Patent: Jan. 10, 2012

(54) OFDMA CONTENTION-BASED RANDOM ACCESS CHANNEL DESIGN FOR MOBILE WIRELESS SYSTEMS

(75) Inventors: Yang-seok Choi, Portland, OR (US); Muthaiah Venkatachalam, Beaverton, OR (US); Xiangying Yang, Portland, OR (US); Apostolos Papathanassiou, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 867 days.

(21) Appl. No.: 12/151,140

(22) Filed: May 2, 2008

(65) Prior Publication Data

US 2009/0274105 A1    Nov. 5, 2009

(51) Int. Cl.
*H04W 4/00* (2009.01)
(52) U.S. Cl. ....................................... 370/329
(58) Field of Classification Search ............... 370/320, 370/328–339, 342, 441
See application file for complete search history.

(56) References Cited

U.S. PATENT DOCUMENTS

| | | | | |
|---|---|---|---|---|
| 6,094,576 A | * | 7/2000 | Hakkinen et al. | 455/422.1 |
| 6,597,675 B1 | * | 7/2003 | Esmailzadeh et al. | 370/335 |
| 7,848,448 B2 | * | 12/2010 | Han et al. | 375/295 |
| 7,876,774 B2 | * | 1/2011 | Zangi | 370/461 |
| 2007/0165567 A1 | * | 7/2007 | Tan et al. | 370/329 |
| 2007/0230600 A1 | * | 10/2007 | Bertrand et al. | 375/260 |
| 2008/0095254 A1 | * | 4/2008 | Muharemovic et al. | 375/260 |
| 2010/0105405 A1 | * | 4/2010 | Vujcic | 455/452.1 |

FOREIGN PATENT DOCUMENTS

| | | |
|---|---|---|
| JP | 02-111631 A | 4/2002 |
| JP | 2008-048413 A | 2/2008 |
| WO | 03/019837 A1 | 3/2003 |
| WO | 2005/086520 A1 | 9/2005 |

OTHER PUBLICATIONS

Office Action received for Japanese Patent Application No. 2009-110099, mailed on Jul. 5, 2011, 2 pages of Office Action and 2 pages of English Translation.

* cited by examiner

*Primary Examiner* — Frank Duong
(74) *Attorney, Agent, or Firm* — Thorpe North & Western LLP

(57) ABSTRACT

Short spreading is used within a random access channel in an OFDM based network to spread data for transmission through the channel. The resource allocation of the random access channel is divided into a number of resource blocks in frequency, time, or both frequency and time. Each resource block has a dimension that is only a portion of the overall size of the resource allocation. During contention, a randomly selected short spreading code may be used to provide data spreading within a randomly selected resource block.

15 Claims, 7 Drawing Sheets

US 8,094,616 B2

OFDMA CONTENTION-BASED RANDOM ACCESS CHANNEL DESIGN FOR MOBILE WIRELESS SYSTEMS

TECHNICAL FIELD

The invention relates generally to wireless communication and, more particularly, to techniques for implementing a random access channel in a wireless system.

BACKGROUND OF THE INVENTION

In a wireless network, an uplink random access channel is an efficient way to allow an uncertain number of mobile stations to send information using a contention-based approach. However, past techniques for implementing a random access channel in a wireless network have performed poorly in many instances. There is a need for enhanced techniques for implementing a random access channel in a wireless network.

DETAILED DESCRIPTION

Figure 1:
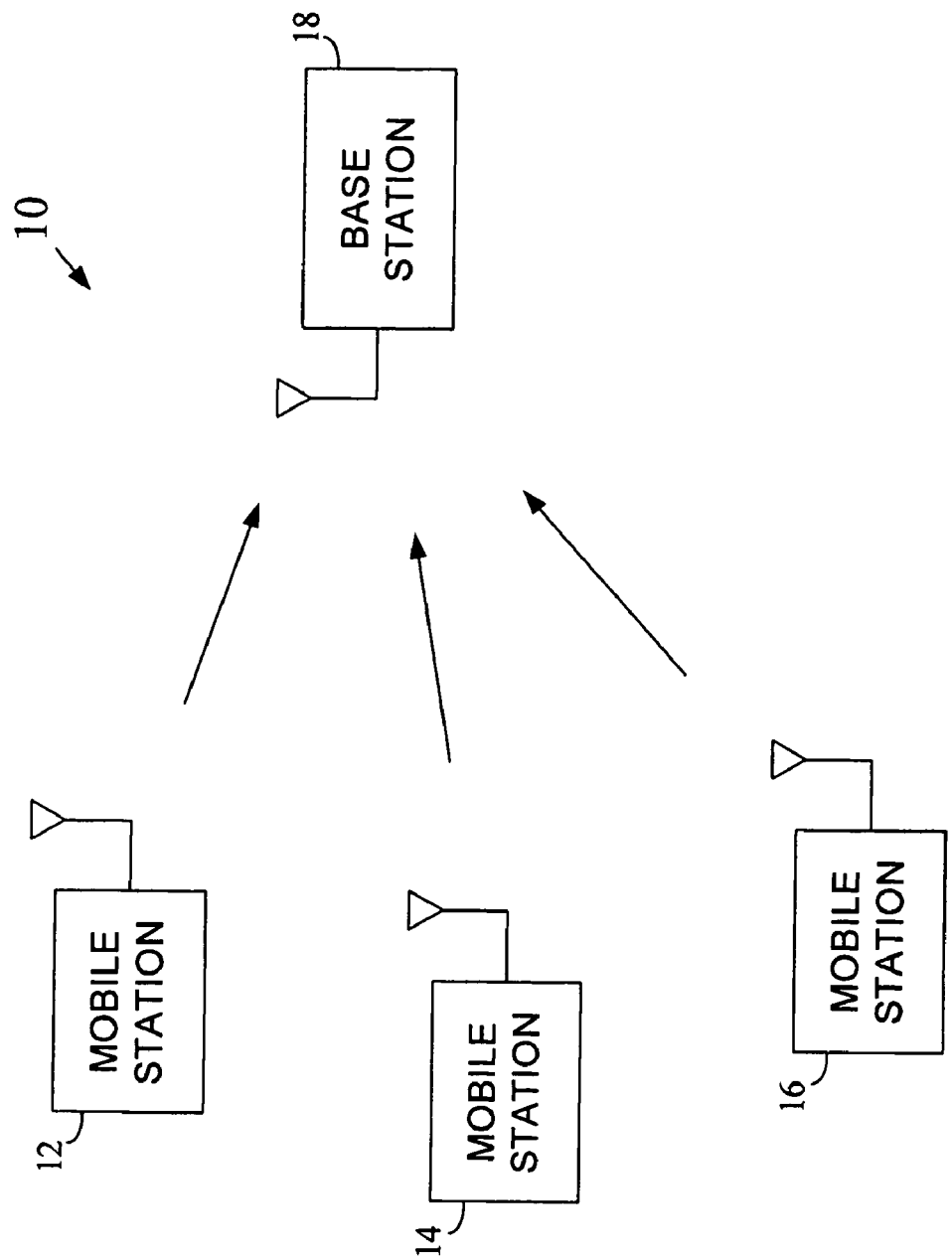
FIG. 1 is a diagram illustrating an example wireless network arrangement that may incorporate features of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a diagram illustrating an example wireless networking arrangement 10 that may incorporate features of the present invention. As illustrated, a number of wireless mobile stations 12, 14, 16 are communicating with a wireless base station 18 via a wireless medium. In such an arrangement, communication from the base station 18 to one or more of the mobile stations 12, 14, 16 is known as downlink communication and communication from the mobile stations 12, 14, 16 to the base station 18 is known as uplink communication. In some networks, downlink communication and uplink communication may be separated in time in a technique known as time-division duplexing (e.g., in an IEEE 802.16 based network that uses a downlink subframe and an uplink subframe). Various schemes exist for allowing the mobile stations 12, 14, 16 to share the available communication resources of the uplink channel. These various schemes may be contention-based or contention-free. A contention-based multiple access scheme is one that allows communication collisions to occur within the channel (i.e., the devices contend or compete for the channel) and a contention-free scheme is one that does not allow collisions to occur. A network may make use of both contention-based and contention-free communication during network operation to perform different communication functions.

One type of contention-based communication technique that is used in wireless networks is the random access channel. In a random access channel, a wireless device that needs to transmit data randomly selects a portion of the allocated communication resources and transmits within the selected resource portion. If no other device transmits within the selected resource portion at the same time, the contention is considered successful. A random access channel is an efficient technique to allow an uncertain number of mobile stations to share an uplink channel in a wireless network. Some wireless network functions that may use a random access channel include, for example: (a) an initial ranging function where a mobile station just enters a network and wishes to obtain a bandwidth allocation from a base station; (b) a bandwidth request (BW-REQ) function where a mobile station has uplink data to transmit to an associated base station but does not have enough allocated bandwidth to carry out the transfer; and (c) some feedback channel functions where the accuracy of the feedback data is not as critical and contention-based communication can thus be tolerated. Other wireless networking functions may also exist for the random access channel.

In a wireless network that uses random access channels, a predetermined allocation of network resources will typically be defined for use by a random access channel. In an orthogonal frequency division multiple access (OFDMA) based system, this allocation of resources may include, for example, a predefined number of orthogonal frequency division multiplexing (OFDM) tones over a predetermined number of OFDM symbol periods. Code division multiple access (CDMA) techniques may also be used in implementing a random access channel. In one approach, for example, a "long spreading" code is used to spread information across the entire resource allocation of the random access channel. This long spreading code technique can be implemented in the frequency domain, in the time domain, or in a combination of frequency and time.

Figure 2:
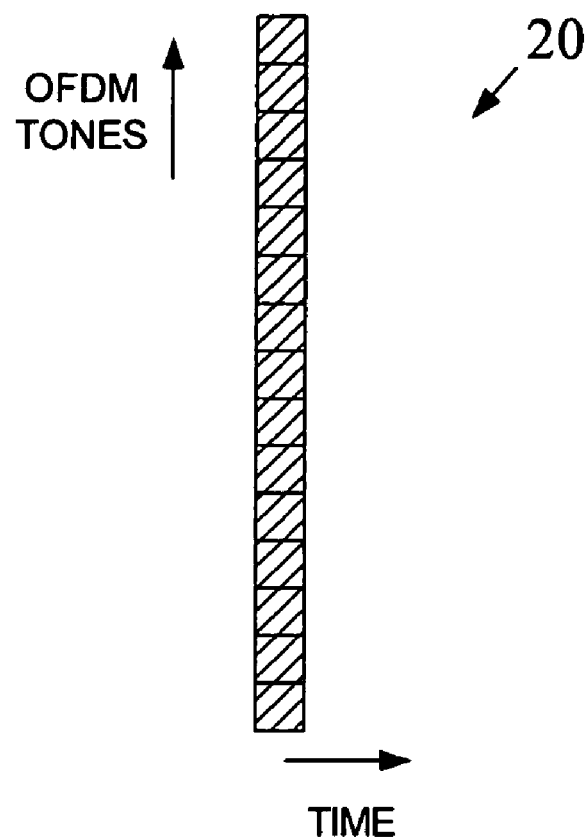
FIGS. 2, 3, and 4 are diagrams illustrating various example resource allocations for random access channels that use long spreading.

FIG. 2 is a diagram illustrating an example resource allocation 20 for a random access channel that uses long spreading in the frequency domain. In the figure, the vertical axis represents frequency in the form of OFDM tones (or subcarriers) and the horizontal axis represents time in the form of OFDM symbols periods. As shown, the resource allocation 20 includes a plurality of OFDM tones for a single OFDM symbol period. Crosshatching is used in FIG. 2 to show the extent over which an element of data is spread within the resource allocation 20. As long spreading is being used, the spreading extends over the full resource allocation in the frequency domain. A long spreading code is designed that will provide orthogonal or quasi-orthogonal long code words or sequences that may be used by mobile devices to access the random access channel having resource allocation 20. Each mobile device wishing to transmit within the random access channel selects a long code word at random from the set of code words and uses it to spread corresponding data. The spread data from all of the transmitting mobile stations may then be transmitted within the same random access channel. Because the code words are orthogonal, the various data signals transmitted within the random access channel will be separable within the receiving base station (e.g., by performing correlation operations or other separation processing). If two or more mobile stations randomly select the same code word, however, a collision will occur and the transmitted data may be lost.

Figure 3:
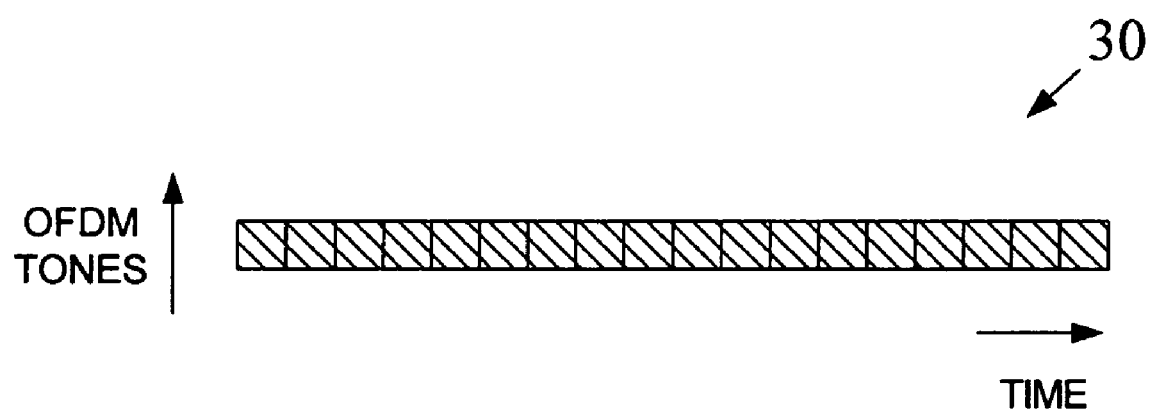

FIG. 3 is a diagram illustrating an example resource allocation 30 for a random access channel that uses long spreading in the time domain. As shown, the resource allocation 30 includes a single OFDM tone extending over a plurality of OFDM symbol periods. Crosshatching is again used to show the extent over which an element of data is spread within the resource allocation 30. As long spreading is again being used, the spreading extends over the full resource allocation 30 in the time domain. An appropriate code is developed for performing the long spreading. As before, a mobile station selects a long code word at random and uses it to spread corresponding data for transmission within the random access channel. The overlapping signals from multiple mobile stations may then be separated in the receiver.

Figure 4:
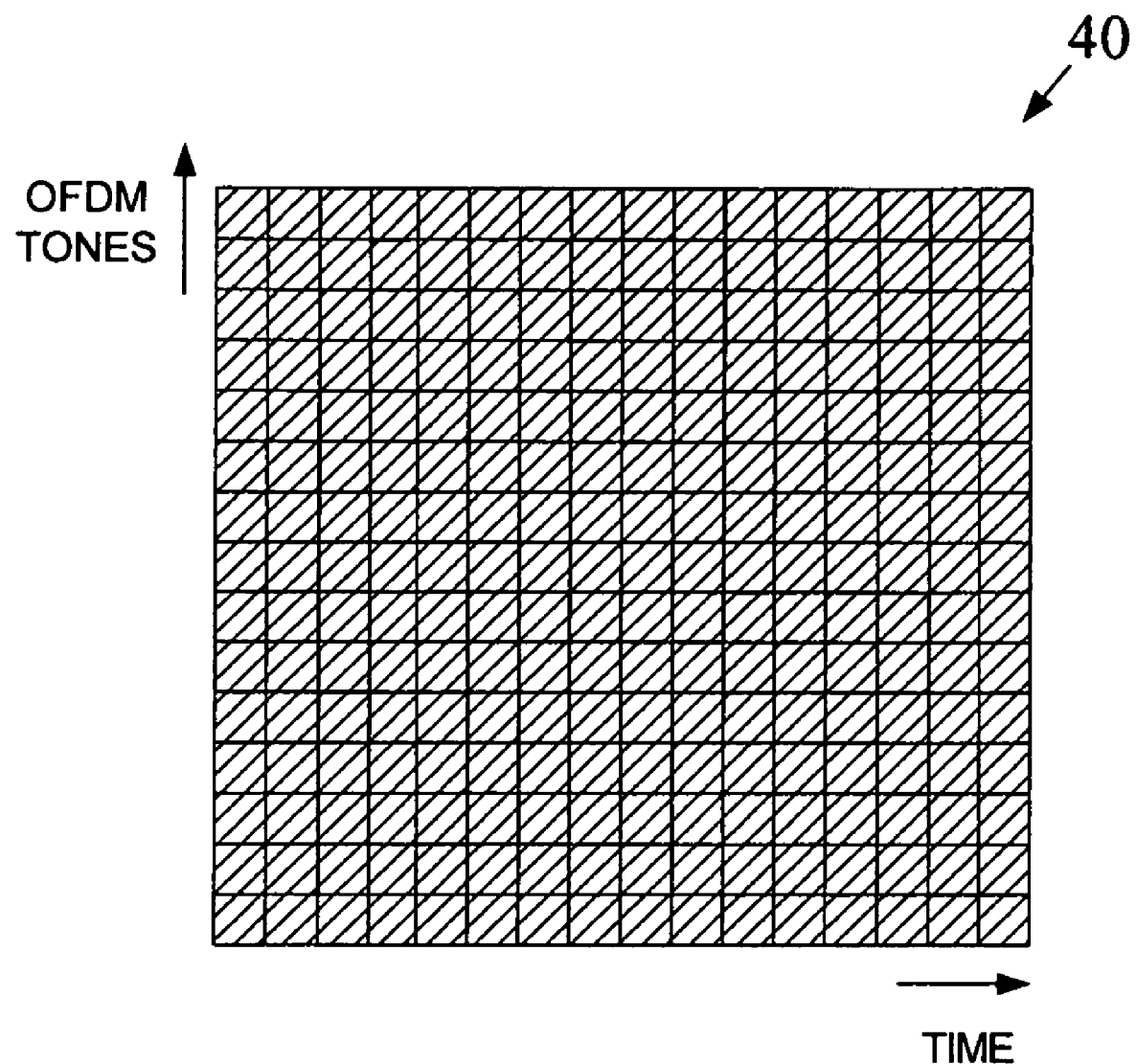

FIG. 4 is a diagram illustrating an example resource allocation 40 for a random access channel that uses long spreading in both frequency and time. The resource allocation 40 includes a plurality of OFDM tones extending over a plurality of OFDM symbol periods. Crosshatching is again used to show the extent of the spreading across the resource allocation 40. Long codes are developed to spread data over both frequency and time over the entire random access channel resource allocation 40. Again, a mobile station selects a long code at random and uses it to spread corresponding data for transmission within the random access channel. The overlapping signals from multiple mobile stations may then be separated in the receiver.

In conceiving the present invention, it was appreciated that the use of long spreading in a random access channel can result in reduced detection resolution and performance in a receiving device. This is because a broadband wireless channel can experience both frequency selective fading in the frequency domain, due to multipath effects, and fast fading in the time domain, due to mobility. Frequency selective fading can reduce the orthogonality of the long code words used to perform spreading in the frequency domain and fast fading can reduce the orthogonality of the long code words used to perform spreading in the time domain. This loss of orthogonality will typically result in a reduction in detection resolution in the receiver. In one aspect of the present invention, short spreading is provided within a resource allocation of a random access channel, instead of long spreading, to overcome the problems inherent in long spreading. That is, the resource allocation is divided up into multiple "resource blocks" that may be used by mobile stations in the network to access the random access channel. Short codes are then designed that spread data to the size of the resource blocks, which is much less than the full extent of the resource allocation. The resource blocks may be distributed in the frequency domain, in the time domain, or in both frequency and time. Because the short code words are significantly shorter than the long code words, the orthogonality of the code words is effected much less by frequency selective fading and/or fast fading in the channel. The short code words should be made long enough, however, to achieve the reliability benefits of using data spreading. In at least one embodiment, the frequency span of each of the resource blocks (i.e., the spreading bandwidth) is made approximately equal to, or less than, the coherence bandwidth of the channel.

Figure 5:
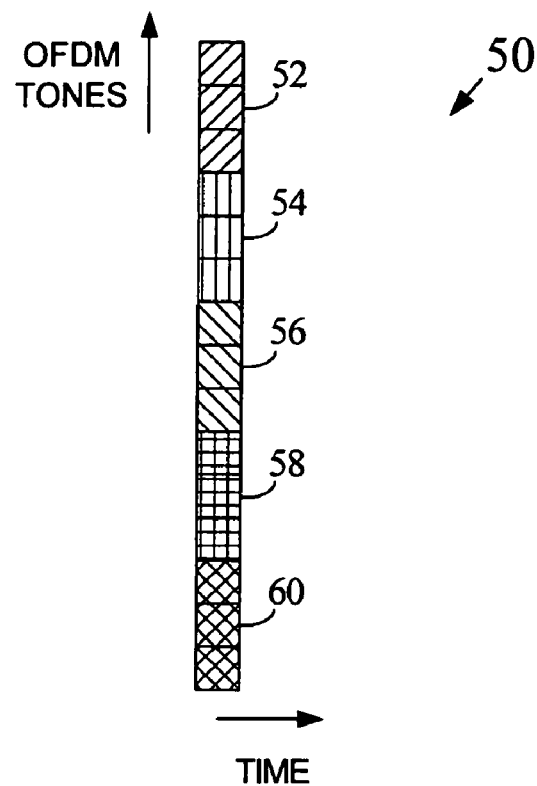
FIGS. 5, 6, and 7 are diagrams illustrating various example resource allocations for random access channels that use short spreading in accordance with embodiments of the present invention.

FIG. 5 is a diagram illustrating an example resource allocation 50 for a random access channel that uses short spreading in the frequency domain in accordance with an embodiment of the present invention. As in FIG. 2, the resource allocation 50 includes a plurality of OFDM tones for a single OFDM symbol period. However, unlike FIG. 2, the resource allocation 50 of FIG. 5 is divided into a number of predefined resource blocks 52, 54, 56, 58, 60 in the frequency domain. Short spreading codes are designed to spread data within the shorter resource blocks 52, 54, 56, 58, 60, rather than across the entire resource allocation 50. Crosshatching is used in FIG. 5 to show the extent of the spreading within each resource block 52, 54, 56, 58, 60 of the resource allocation. Because shorter codes are used, frequency selective fading in the random access channel has less effect on the orthogonality of the code words than it would have on a single long code. That is, the small sequence length increases the likelihood of channel coherence across the spreading bandwidth even in a frequency selective fading channel. The short codes need to made long enough, however, to achieve the desired reliability benefits of spreading in the presence of background thermal noise and random interference.

In at least one embodiment, when a mobile station wishes to access a random access channel having the resource allocation 50 of FIG. 5, the device first selects one of the predefined resource blocks 52, 54, 56, 58, 60 at random. Once a block has been selected, the mobile device may then select a code word from a predetermined set of short code words for use in spreading the corresponding data within the selected resource block. The mobile station may then use the selected code to transmit the data within the selected block.

Figure 6:
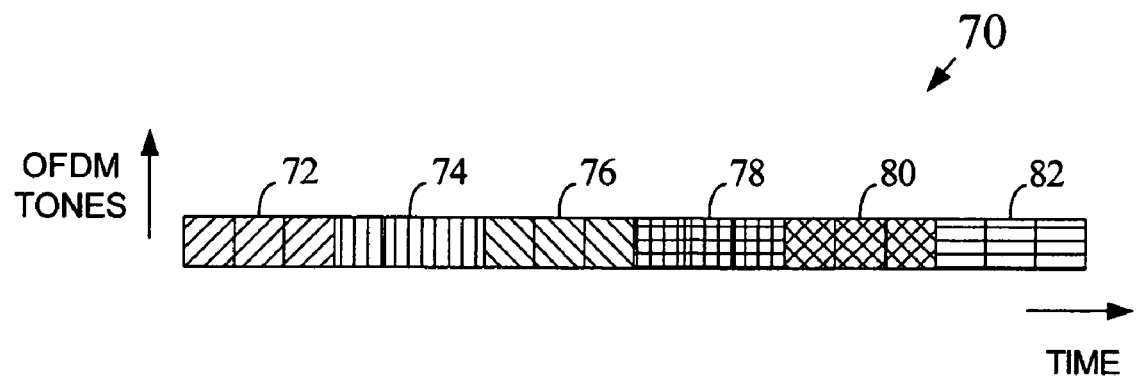

FIG. 6 is a diagram illustrating an example resource allocation 70 for a random access channel that uses short spreading in the time domain in accordance with an embodiment of the present invention. The resource allocation 70 includes a single OFDM tone extending over a plurality of OFDM symbol periods. As shown, the resource allocation 70 of FIG. 6 is divided into a number of predefined resource blocks 72, 74, 76, 78, 80, 82 in the time domain. Short spreading codes are designed to spread data within the shorter resource blocks 72, 74, 76, 78, 80, 82, rather than across the entire resource allocation 70. Because shorter codes are used, fast fading in the random access channel has less effect on the orthogonality of the code words than it would have on a single long code. That is, the small sequence length increases the likelihood of channel coherence across the spreading time span even under high mobility conditions. As before, the short codes need to made long enough to achieve the desired reliability benefits of spreading in the presence of background thermal noise and random interference.

Figure 7:
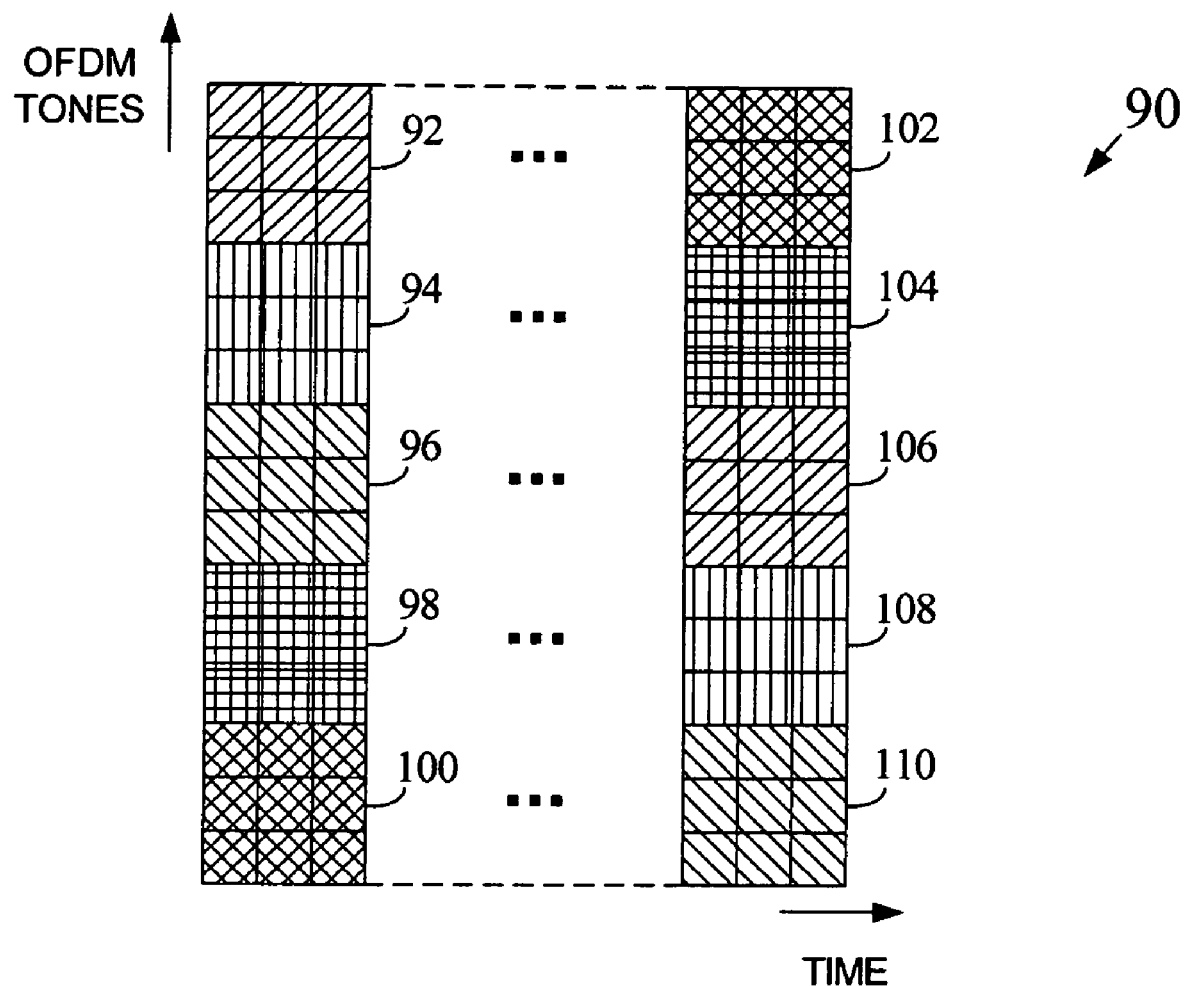

FIG. 7 is a diagram illustrating an example resource allocation 90 for a random access channel that uses short spreading in both frequency and time in accordance with an embodiment of the present invention. The resource allocation 90 includes a plurality of OFDM tones extending over a plurality of OFDM symbol periods. As shown, the resource allocation 90 of FIG. 7 is divided into a number of predefined resource blocks 92, 94, 96, 98, 100, 102, 104, 106, 108, 110 in both frequency and time (i.e., two dimensional blocks). Short spreading codes are designed to spread data within the resource blocks 92, 94, 96, 98, 100, 102, 104, 106, 108, 110 in frequency and time.

It should be appreciated that the resource allocations and short spreading block patterns of FIGS. 5, 6, and 7 are merely examples of different ways that an allocation may be arranged in accordance with embodiments of the present invention. Many other allocation schemes and block patterns may alternatively be used including using, for example, different resource allocation sizes and different block sizes. In some implementations using two dimensional blocks, short spreading may first be performed in the time domain and then in the frequency domain. In others, short spreading may be performed in the time domain and the frequency domain concurrently.

Any of a number of different coding types may be used to design the short codes for use within the resource blocks. For example, possible alternatives include: (a) fully orthogonal spreading using Walsh codes or Zadoff-Chou sequences, (b) quasi-orthogonal spreading using maximal pseudo random noise (PN) sequences, (c) cross-orthogonal codes that can facilitate simple differential encoding/decoding with good detection, and/or others. Features of the present invention may be incorporated into any OFDM based wireless network that utilizes a random access channel including, for example, networks following the IEEE 802.16 family of standards, networks following the proposed 3GPP long term evolution (LTE) standards, networks following IEEE 802.20 ultra mobile broadband (UMB) standards, and/or others.

Figure 8:
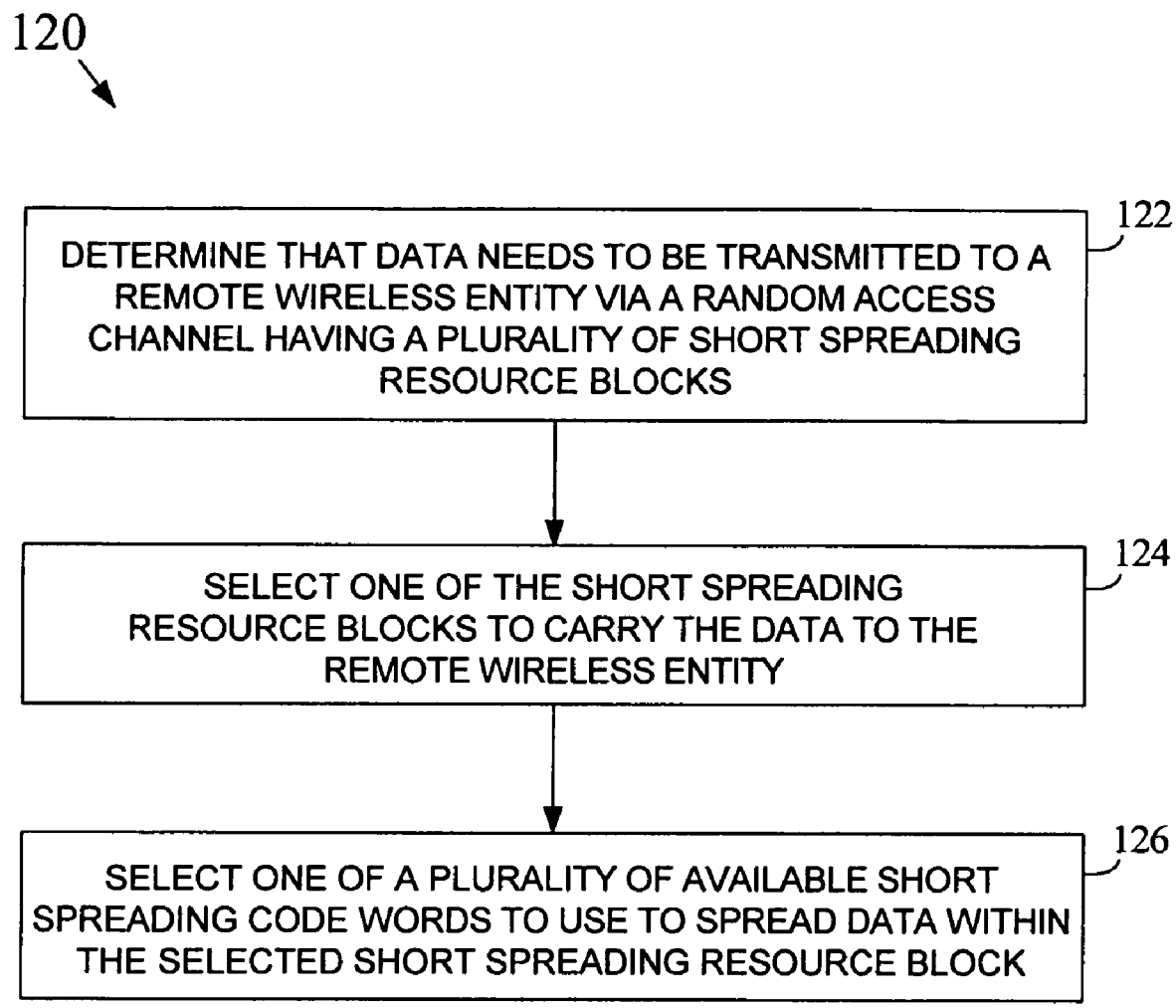
FIG. 8 is a flowchart illustrating a method for use in gaining access to a random access channel that uses short spreading in accordance with an embodiment of the present invention.

FIG. 8 is a flowchart illustrating a method 120 for use in accessing a random access channel that is divided into multiple short spreading resource blocks in accordance with an embodiment of the present invention. The method 120 may be used in connection with any of the resource allocation schemes of FIGS. 5, 6, and 7 and also with other schemes. A mobile station first makes a determination that data needs to be transmitted to a remote wireless entity via a random access channel having a plurality of short spreading resource blocks (block 122). The resource blocks are shorter than the full resource allocation for the random access channel in either the time domain or the frequency domain, or both. After the determination is made, the mobile station randomly selects one of the short spreading resource blocks to carry the data to the remote wireless entity (block 124). The mobile station then randomly selects one of a plurality of available short spreading code words or sequences to spread the data within the selected short spreading resource block (block 126). The selected code word is then used to transmit the data within the selected resource block. The other mobile stations in the contention, if any, would follow substantially the same procedure.

Instead of random selection of the short spreading resource block and the short spreading code word, a more advanced contention management approach may alternatively be used in the method 120 described above such as, for example, "sticky contention." Sticky contention is the subject of co-pending U.S. patent application Ser. No. 11/618,642 filed on Dec. 29, 2006, which is owned by a common assignee and is hereby incorporated by reference. The use of sticky contention in a random access channel using short spreading can result in improved performance in a low load regime.

At the physical layer, when band-AMC is used, short spreading may also take advantage of frequency diversity by selecting a contention slot with good channel condition. This is based on the knowledge of downlink channel condition, which is always available, and the assumption of downlink/uplink channel reciprocity. Every contender picks a contention slot in which it likely enjoys a good channel, which effectively provides SNR gain for contention transmission. On the other hand, this is not possible for long spreading approach.

From a regulatory requirement, a mobile station has a certain power envelope that it can transmit. With short spreading, each contender has fewer tones (or sub-carriers) to distribute the total transmission power. Therefore, a certain level of power boosting may be allowed when short spreading is used. This directly enables SNR gain for contention transmission and helps with detection performance.

Another benefit to the use of short spreading sequences in the random access channel is related to power control. That is, the use of short spreading with predefined resource blocks relaxes the power control requirement. When no interference cancellation is being performed, proper power control is necessary in the uplink for CDMA multiple access. When long spreading is used, each contention code will see all of the other contention codes as interference. Power control has to be accurate in order to handle a large number of contenders. This is especially true when the practical spreading gain is significantly less than the theoretical value due to the loss of orthogonality. With short spreading, on the other hand, because the contenders are distributed among the different contention blocks, each contention code in a given block sees a much smaller number of other contention codes. Since the practical spreading gain is comparable to the long spreading case, the stringent requirement on power control is effectively reduced.

Still another benefit of using short spreading in the random access channel is that it allows successive interference cancellation to be performed. This is because of the better channel coherence in the frequency and/or time domain when using short spreading. The first detected sequence in the receiver (e.g., corresponding to the largest correlation) can be used to estimate the phase and amplitude and then be subtracted from the received signal. This process can then be performed iteratively given the complexity and delay threshold.

Short spreading also enables the use of adaptive resource allocation for the random access channel. The base station can determine how many contention slots should be allocated based on the knowledge of the contention load. For example, when a base station sees a surge of contentions, it can allocate more contention slots in the next round, therefore ensuring the stability of the random access channel and quality of service (QoS) guarantee.

Figure 9:
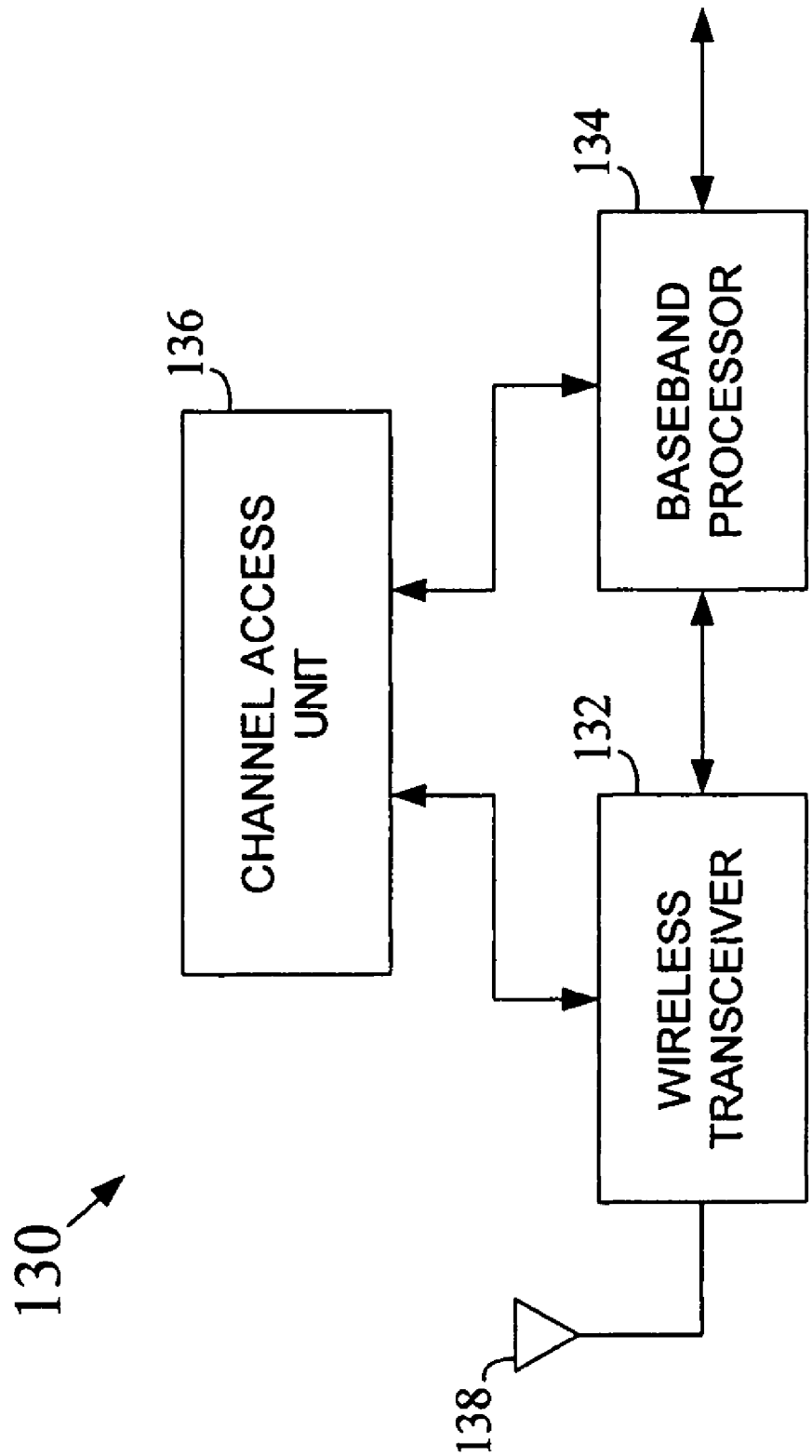
FIG. 9 is a block diagram illustrating an example mobile device in accordance with an embodiment of the present invention.

FIG. 9 is a block diagram illustrating an example mobile device 130 in accordance with an embodiment of the present invention. As shown, the mobile device 130 includes: a wireless transceiver 132, a baseband processor 134, and a channel access unit 136. The wireless transceiver 132 may be coupled to one or more antennas 138 to facilitate communication with remote entities. The wireless transceiver 132 is operative for performing radio frequency processing of signals in support of wireless communication with a remote entity. The baseband processor 134 may perform base band operations in support of the communication. During a receive operation, the wireless transceiver 132 may receive wireless signals from the wireless medium and process them to generate a baseband signal at an output thereof. The baseband signals may then be further processed by the baseband processor before being delivered to a user or another processor. During a transmit operation, the wireless transceiver 132 may receive baseband signals from the baseband processor 134 and use them to generate wireless signals for transmission into the wireless channel.

The channel access unit 136 is operative for managing access operations involving random access channels that use short spreading techniques such as those described above. In at least one embodiment, for example, the channel access unit 136 may be configured to perform the method 120 of FIG. 8. The channel access unit 136 may be called upon when, for example, the mobile device 130 has just entered a wireless network and desires to obtain a bandwidth allocation from a base station in a ranging operation via a random access channel. Similarly, the channel access unit 136 may be called upon when the mobile device 130 requires additional allocated bandwidth and thus desires to transmit a bandwidth request via a random access channel. Many other applications may alternatively be used. When the channel access unit 136 determines that communication within a random access channel is needed, it may select one of the short spreading resource blocks of the random access channel allocation at random. The channel access unit 136 may then select a short code word from a plurality of available code words for use in spreading data within the selected block. The channel access unit 136 may then instruct the baseband processor 134 and the wireless transceiver 132 as to the selected block and code word. The baseband processor 134 and the wireless transceiver 132 may then transmit the spread data within the desired block. The channel access unit 136 may be a separate unit or be implemented by the baseband processor 134. In at least one embodiment, the wireless transceiver 132, the baseband processor 134, and the channel access unit 136 are all implemented within a common digital processing device. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), a microcontroller, and/or others. Hardware, software, firmware, and hybrid implementations may be used.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; mobile vehicle based communicators; base stations; wireless access points; integrated circuits; as instructions and/or data structures encoded on computer readable media; and/or in other formats. Examples of different types of computer readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
   determining, at a channel access unit, that data needs to be transmitted from a wireless transceiver to a remote wireless entity via a random access channel having a resource allocation that is divided into a plurality of resource blocks distributed in at least one of frequency and time in an orthogonal frequency division multiplexing (OFDM) based system;
   selecting, at the channel access unit, a resource block at random from said plurality of resource blocks to carry said data to said remote wireless entity, in response to determining; and
   selecting, at the channel access unit, one of a plurality of available short spreading code words at random to spread said data within said selected resource block.

2. The method of claim 1, wherein:
   said resource allocation of said random access channel includes a number of resource blocks distributed in frequency, wherein each of said resource blocks includes multiple OFDM tones.

3. The method of claim 1, wherein:
   said resource allocation of said random access channel includes a number of resource blocks distributed in time, wherein each of said resource blocks includes multiple OFDM symbol periods.

4. The method of claim 1, wherein:
   said resource allocation of said random access channel includes a number of resource blocks distributed in frequency and time, wherein each of said resource blocks includes multiple OFDM tones and multiple OFDM symbol periods.

5. The method of claim 1, wherein:
   each resource block in said plurality of resource blocks has a spreading bandwidth that is approximately equal to a coherence bandwidth of said random access channel.

6. An apparatus for use in an orthogonal frequency division multiplexing (OFDM) based network, said apparatus comprising:
   a wireless transceiver;
   a baseband processor; and
   a channel access unit to determine when data needs to be transmitted to a remote wireless entity via a random access channel having a resource allocation that is divided into a plurality of resource blocks distributed in at least one of frequency and time, to select a resource block at random from said plurality of resource blocks to carry said data to said remote wireless entity, and to randomly select one of a plurality of available short spreading code words to spread said data within said selected resource block.

7. The apparatus of claim 6, wherein:
   said resource allocation of said random access channel includes a number of resource blocks distributed in frequency, wherein each of said resource blocks includes multiple OFDM tones.

8. The apparatus of claim 6, wherein:
said resource allocation of said random access channel includes a number of resource blocks distributed in time, wherein each of said resource blocks includes multiple OFDM symbol periods.

9. The apparatus of claim 6, wherein:
said resource allocation of said random access channel includes a number of resource blocks distributed in frequency and time, wherein each of said resource blocks includes multiple OFDM tones and multiple OFDM symbol periods.

10. The apparatus of claim 6, wherein:
each resource block in said plurality of resource blocks has a spreading bandwidth that is approximately equal to a coherence bandwidth of said random access channel.

11. A computer readable non-transitory storage medium having computer executable instructions encoded thereon that, when executed by a computing platform, operate to:
determine that data needs to be transmitted to a remote wireless entity via a random access channel having a resource allocation that is divided into a plurality of resource blocks distributed in at least one of frequency and time in an orthogonal frequency division multiplexing (OFDM) based system;
select a resource block at random from said plurality of resource blocks to carry said data to said remote wireless entity in response to said determination; and
select one of a plurality of available short spreading code words at random to spread said data within said selected resource block.

12. The computer readable storage medium of claim 11, wherein:
said resource allocation of said random access channel includes a number of resource blocks distributed in frequency, wherein each of said resource blocks includes multiple OFDM tones.

13. The computer readable storage medium of claim 11, wherein:
said resource allocation of said random access channel includes a number of resource blocks distributed in time, wherein each of said resource blocks includes multiple OFDM symbol periods.

14. The computer readable storage medium of claim 11, wherein:
said resource allocation of said random access channel includes a number of resource blocks distributed in frequency and time, wherein each of said resource blocks includes multiple OFDM tones and multiple OFDM symbol periods.

15. The computer readable storage medium of claim 11, wherein:
each resource block in said plurality of resource blocks has a spreading bandwidth that is approximately equal to a coherence bandwidth of said random access channel.

* * * * *